United States Patent [19]

Frazzoli

[11] Patent Number: 4,729,699
[45] Date of Patent: Mar. 8, 1988

[54] DEVICE FOR PERFORMING SPOT-FACINGS, IN PARTICULAR AT THE NON-ACCESSIBLE END OF THROUGH-HOLES

[76] Inventor: Luciano Frazzoli, Via Benazzi, 2 - Bologna, Italy

[21] Appl. No.: 5,064

[22] Filed: Jan. 20, 1987

[30] Foreign Application Priority Data

Jan. 28, 1986 [IT] Italy ................... 3322 A/86

[51] Int. Cl.[4] ................. B23B 51/00; B23B 29/18
[52] U.S. Cl. ........................ 408/152; 408/159; 408/180; 408/187
[58] Field of Search ............... 175/267, 269, 284–289; 408/73, 74, 148, 152, 159, 180, 187

[56] References Cited

U.S. PATENT DOCUMENTS

| | | | |
|---|---|---|---|
| 3,019,712 | 2/1962 | Winberry, Jr. | 408/187 |
| 3,572,182 | 3/1971 | MacDonald | 408/187 |
| 3,806,271 | 4/1974 | Ishiguro et al. | 408/159 |
| 3,814,535 | 6/1974 | Steiner | 408/73 |
| 3,827,821 | 8/1974 | Swenson | 408/159 X |
| 4,411,324 | 10/1983 | Liebig | 408/159 X |
| 4,475,852 | 10/1984 | Koppelmann | 408/73 |

FOREIGN PATENT DOCUMENTS 2625861  12/1976  Fed. Rep. of Germany ...... 408/159

*Primary Examiner*—Gil Weidenfeld
*Assistant Examiner*—Steven C. Bishop
*Attorney, Agent, or Firm*—Guido Modiano; Albert Josif

[57] ABSTRACT

The device comprises a body longitudinally provided with a stem which is suitable for being inserted into the hole of a part being machined. On the body an element is slideably coupled which has an element for attachment to the mandrel of the machine tool, which element is adapted for imparting rotation to the body itself. On the stem is slideably mounted a shaft which is articulated at its end with a tool and is coupled to the attachment element so that an axial sliding of the same element towards the part being machined actuates a sliding motion in the opposite direction of the shaft adapted for actuating the radial projection of said tool from said stem.

10 Claims, 3 Drawing Figures

DEVICE FOR PERFORMING SPOT-FACINGS, IN PARTICULAR AT THE NON-ACCESSIBLE END OF THROUGH-HOLES

BACKGROUND OF THE INVENTION

The present invention relates to a device for performing spot-facings, in particular at non-accessible ends of through-holes and the like.

As is known, in mechanical technology the need often arises to perform spot-facings at the ends of holes, in order to provide, e.g., a resting seat for the head of screw elements and the like. Such spot-facings, composed of a shallow circular recess with a flat bottom, are generally executed by means of specific tools, made to rotate by the machine tool and fitted with a radial cutting edge.

When spot-facing is required at the outlet of a through hole, there is the problem of avoiding the need to remove the part being machined, in particular in the case of automatic machines, where it would be necessary to interrupt the working cycle. In order to perform spot-facing in such non-accessible regions, devices are commonly used which are provided with a tool removably mounted at the end of a stem which is suitable for being introduced through the hole of the part being machined. This solution, however, is quite disadvantageous, since it requires the removal and subsequent refitting of the tool on the device at each machining process.

In order to avoid this disadvantage, decives have been used which are provided with a tool which can be rotated in a longitudinal position with respect to the stem or pushed elastically inside the same, so as to be able to pass through the hole without having to be removed. In other words, in order to insert the stem of the device into the hole, the retraction of the tool is caused and the same is taken back into a working position after it leaves the same hole; at this point the stem is moved in the reverse direction so as to place the cutting edge in contact with the part and perform the spot-facing.

This solution, though it has many advantages, is not, however, entirely satisfactory. Indeed, the various operating steps require not-negligible times to perform the machining, as well as suitable controls on the part of the machine. Furthermore, the possibility of adjusting the size of the spot-facing to be performed is generally severely limited, so that it is necessary to provide several devices to meet all the various requirements.

SUMMARY OF THE INVENTION

An aim of the present invention is to solve the above described problem by providing a device which allows the quick actuation of the spot-facings as well as the possibility of precisely adjusting the dimensions thereof.

Within the scope of this aim, a further object of the invention is to provide a device which is simply conceived, safe and reliable in operation and versatile in use according to the various requirements.

This aim and object and other objects which will become apparent hereinafter are achieved, according to the invention, by the present device for performing spot-facings on machine tools, particularly at the non-accessible end of through holes, characterized in that it comprises a body longitudinally provided with a stem, adapted for being inserted into a hole of a part being machined, an element for attachment to the mandrel of the machine tool being slideably mounted on said body and adapted for imparting rotation to the body itself, and a shaft slideably guided on said stem and articulated at its end to a tool, rotatable between a position of alignment with said stem and a position radially projecting from the stem, said shaft being coupled to said attachment element so that an axial sliding of the same element towards the part being machined actuates a sliding motion in the opposite direction of the shaft adapted for actuating the radial projection of said tool from said stem.

BRIEF DESCRIPTION OF THE DRAWINGS

The details of the invention will become apparent from the detailed description of a preferred embodiment of the device for performing spot-facings, illustrated only by way of example in the accompanying illustrative, non-limitative drawings, wherein.

DESCRIPTION OF THE PREFERRED EMBODIMENTS

Figure 1:
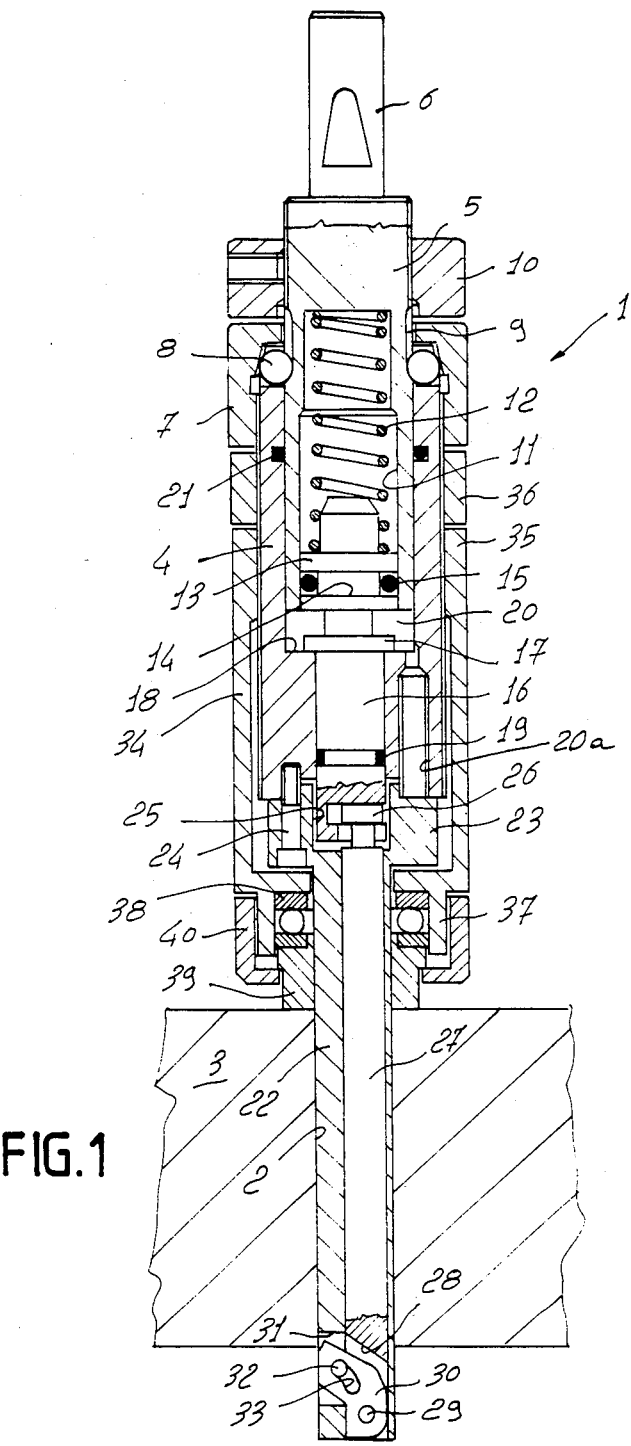
FIG. 1 is a longitudinal cross-section view of the device according to the invention.

With reference first to FIG. 1, the device, for performing spot-facings at the non-accessible end of a through hole 2 in a workpiece or part 3 being machined on the machine tool has been generally indicated with the reference numeral 1.

The device 1 comprises a tubular body 4 with a substantially cylindrical shape, which is externally threaded and slideably mounted onto a cylindrical element 5 provided at one end with an attachment 6 for the mandrel of the machine tool. The body 4 is rotatably rigidly coupled to the cylindrical element 5 by means of a traction ring or ring nut 7, adapted for threading onto the body 4 itself and provided with suitable self-locking means. The ring 7 defines, at a portion thereof facing the body 4, a housing for a pair of traction balls or spheres 8, which; are advantageously diametrally opposed; fitted in respective recesses of said body 4; and engage respective grooves 9 extending longitudinally on the outer surface of the cylindrical element 5. The grooves 9 extend for a brief tract, between a portion of the cylindrical element 5, inserted into the cavity of the tubular body 4, and an end portion which is threaded externally; on said threaded portion a ring 10 is threaded which, as will become apparent hereinafter, is adapted for limiting the operating stroke of the device.

The cylindrical element 5 is provided with a cylindrical axial cavity 11, open at the opposite side with respect to the attachment 6. In the cavity 11 a small piston 13, provided with an annular neck 14 for a sealing gasket 15, is slideably mounted against the biasing action of a helical spring 12 acting in compression on the bottom of the cavity itself.

The piston 13 is shaped along a stem 16 which has at a substantially central position thereof a crown 17 adapted for abutting a shoulder 18 defined by a narrowing of the axial cavity of the tubular body 4; in the narrowed portion of this cavity, the stem 16 of the piston 13 is sealingly slideable, the seal being effected by a gasket 19 mounted in a related annular groove.

Defined between the cylindrical element 5 and the piston 13 on one side and the shoulder 18 on the other, is a chamber 20, intended to be filled with a suitable hydraulic fluid, through a threaded hole 20a fitted with suitable sealing closure means.

A gasket 21 accommodated in an annular groove of the body 4, ensures the seal between the latter and the cylindrical element 5.

The tubular body 4 is provided longitudinally, on the side opposite to the one on which it couples to the cylindrical element 5, with a stem 22 which is adapted for insertion through the hole 2 formed in the part 3 being machined.

The stem 22 is provided, at one end, with a thickening 23 in which the seats for a plurality of screws 24 for fixing to the tubular body 4 are provided, and advantageously angularly distributed. A hole 25 in which the end of the stem 16 is inserted is also axially provided in the thickening 23. At this end the stem 16 is provided with a coupling seat for a tang 26 of a small tool-bearing shaft 27.

The shaft 27 is slideably mounted in a corresponding hole provided longitudinally with respect to the stem 22, and with its axis offset with respect to the axis of the latter. The shaft 27 is provided, at the end, on a longitudinal mid-plane, with a slot 28 so as to provide a sort of fork transversely bearing a pivot 29 for articulating the tool 30.

The tool 30 has an angled shape and is adapted for projecting with its cutting edge from an opening 31 provided along the stem 22. The rotation of the tool is advantageously guided by a cam-like arrangement comprising a pivot 32 transversely carried by the stem 22 and traversing a slot 33 having a curved profile corresponding to the tool itself.

The tubular body 4 is partially inserted into a sort of sleeve or barrel 34 which has a drilled bottom for the passage of the stem 22 and an internally threaded mouth 35 for the threading of the body 4 itself. This threading defines the axial position of the body 4 with respect to the barrel 34. A ring 36 threaded on the body 4 itself acts as a pivot with respect to the barrel 34.

From the bottom of the small barrel 34 an annular lip 37 extends, which is threaded externally and defines the seat for a thrust bearing 38. The bearing 38 is locked by an annular pad 39 which is inserted on the stem 22 and is in turn retained by a ring 40 threaded on the lip 37.

The operation of the device described is as follows.

The device is fitted to the mandrel of the machine tool by means of the shaped attachment 6 of the cylindrical element 5. This cylindrical element is adapted for imparting a rotation to the tubular body 4 and to the elements coupled thereto by means of the traction balls 8.

The stem 22 is then inserted into the hole 2 of the part 3 being machined, until the pad 39 abuts on the part 3 itself. It should be noted that the threading of the barrel 34 on the body 4 allows the previous precise adjustment of the length of the portion of stem 22 protruding with respect to the pad 39. In this manner it is possible to adjust the operating position of the tool according to the thickness of the part 3 and the depth of the spot-facing to be performed.

The axial thrust on the cylindrical element 5 is continued after the stem 22 has been completely inserted, so as to give rise to its axial displacement by sliding with respect to the tubular body 4 which is blocked in abutment with the part. This sliding gives rise to the sliding in the opposite direction of the piston 13, against the biasing action exerted by the spring 12, as an effect of the pressure thereon of the hydraulic fluid which fills the chamber 20. It should be noted that the grooves 9 of the cylindrical element 5 allow its sliding with respect to the balls 8 for transmitting the rotating motion. The stroke of the cylindrical element 5 is limited by the abutment of the ring 10, rigidly coupled thereto, on the ring 7 threaded onto the body 4.

The sliding of the piston 13 controls in turn the motion, inside the stem 22, of the shaft 27, which is coupled to the stem 16 of the piston 13. The motion of the shaft causes a shift and an angular rotation of the tool 30, which projects from the opening 31 of the stem 22 and, since it is simultaneously caused to rotate by the device, performs the required spot-facing.

Figure 2:
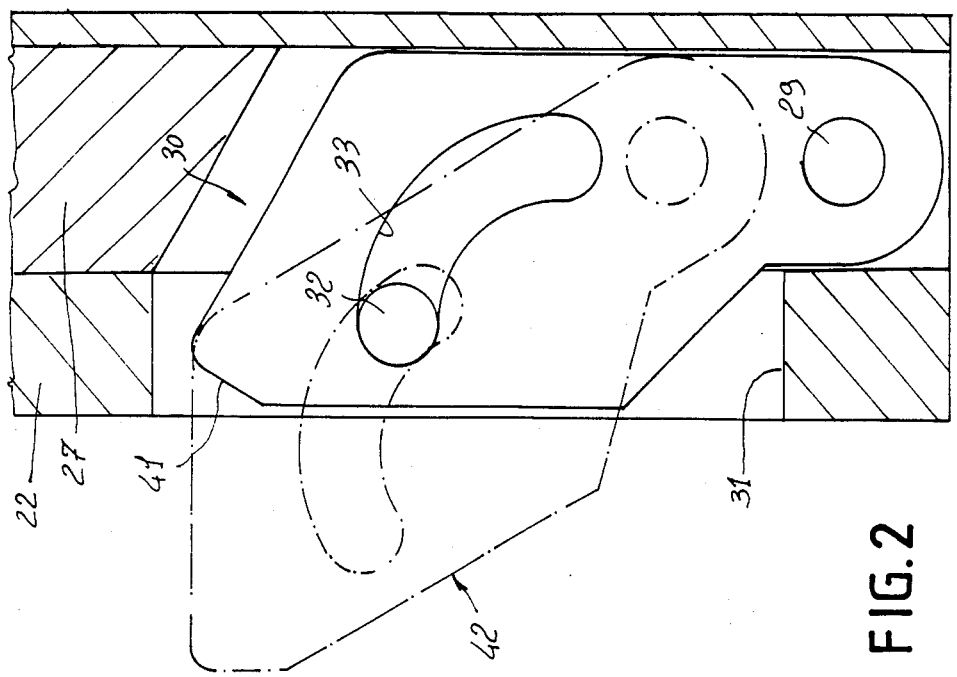
FIG. 2 is a detail view of the tool of the device.

As is illustrated in detail in FIG. 2, the shaping of the slot 33, which guides the angular rotation in projection of the tool, causes the cutting edge 41, provided substantially at the opposite end with respect to the pin 29, to shift radially with respect to the stem 22. The position assumed by the tool when completely extracted is indicated in broken lines 42 in the drawing (FIG. 2). The projection of the tool, which is simultaneous to the axial thrust imparted to the tool, allows the immediate start of the spot-facing, since the cutting edge 41, directed towards the part, is in a working position.

It should be noted that the ring 10, by limiting the operating stroke of the cylindrical element 5, and therefore also the inverse stroke of the small shaft 27, allows adjustment as required, of the extent of the extraction of the tool and therefore the diameter of the spot-facing.

Once the machining has been performed, the return stroke of the device is actuated. In a first step, the end of the axial thrust on the cylindrical element 5 causes the reverse stroke of the piston 13, actuated by the spring 12, and consequently the retraction of the tool 30 inside the stem 22. The stem 22 can thus be extracted from the hole 2. It is naturally possible to provide for the return of the piston 13 to be controlled by different means, e.g. of the hydraulic type.

Figure 3:
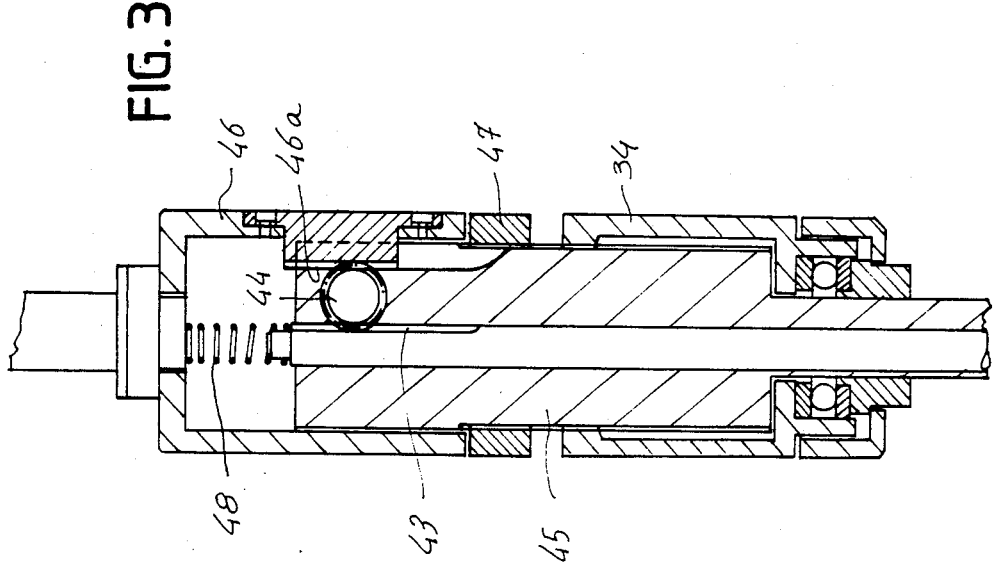
FIG. 3 is a longitudinal cross section view of another aspect of the device for performing spot-facings.

FIG. 3 illustrates a different embodiment of the device, using, to control the shaft for operating the tool, rack means. More in detail, said shaft is provided with the shape of a rack 43 which engages with a toothed wheel 44 rotatably carried inside a tubular body 45.

On the diametrally opposite side, a further rack 46a furthermore engages with the toothed wheel 44, which rack is fixed to a cylindrical element 46 which is axially slideably mounted on the tubular body 45, until it abuts with a ring 47 which threads onto the tubular body itself. Similarly to what has been previously illustrated, the cylindrical element 46 is adapted for imparting a rotation to the tubular body 45.

In this case, the active stroke of the cylindrical element 46 controls, by means of the rack 46a, the rotation of the toothed wheel 44 and consequently the inverse stroke of the shaft, against the biasing action of a related spring 48.

The device according to the invention allows one to perform spot-facings at the outlet of holes quickly and precisely.

In particular, the fact should be stressed that the cutting action is a direct continuation of the step of introducing the stem into the hole, so that the machining, in practice, requires only one active stroke and one return stroke of the device. It is furthermore possible to adjust on the device itself the dimensions of the required spot-facing.

It should be furthermore noted that the easy interchangeability of the stem with the small tool-bearing shaft allows to provide a series of tools suitable for covering all the possible dimensions of execution of spot-facings. In particular, the removal of the stem carrying the tool-bearing small shaft can be easily performed without acting on the thrust-transmitting elements, inside the body 4.

In the practical embodiment of the invention, the materials employed, the shape and the dimensions may be any according to the requirements.

What is claimed is:

1. In combination, a machine tool mandrel and a device for performing spot-facings, in particular at non-accessible ends of through holes, said device comprising at least one attachment element, at least one tool, at least one shaft having an end, and at least one body having at least one longitudinal stem, said stem being adapted for insertion into a hole formed in a workpiece, said attachment element being attachable to said machine tool mandrel and slidably mounted on said body, said machine tool mandrel being adapted for rotation, said attachment element being adapted for imparting said rotation of said machine tool mandrel to said body, said shaft being slidably guided on said stem, said tool being articulated to said end of said shaft and rotatable between a position whereat said tool is aligned with said stem and a position whereat said tool projects radially from said stem, said shaft being coupled to said attachment element so that an axial sliding movement of said attachment element towards a workpiece actuates a sliding motion in an opposite direction of said shaft adapted for moving said tool to said position whereat said tool projects radially from said stem.

2. Combination according to claim 1, wherein said device further comprises cam means, and at least one cutting edge, said cam means being rigidly associated with said stem, said tool defining at least one articulation end, a central portion and at least one opposite end, said cam means being adapted for guiding at least said central portion of said tool, said cutting edge being formed on said opposite end of said tool and adapted to be directed towards a workpiece so as to be operable when in said position whereat said tool projects radially from said stem.

3. Combination according to claim 1, wherein said device further comprises at least one barrel having a bottom, said body being mounted in said barrel in an axially adjustable position, said stem protruding from said bottom of said barrel, said bottom of said barrel being adapted for abutment engagement with a workpiece upon said stem being introduced into a hole formed in the workpiece.

4. Combination according to claim 1, wherein said device further comprises ball means, longitudinal grooves, and seats, said longitudinal grooves being formed on said attachment element, said seats being formed on said body, said ball means being at least partially accommodated in said seats engaging said longitudinal grooves for coupling said attachment element to said body, said attachment element defining a sliding stroke with respect to said body, said device further comprising means for adjusting said sliding stroke.

5. Combination according to claim 1, wherein said device further comprises at least one piston, at least one axial cavity, and hydraulic means, said axial cavity being formed in said attachment element, said piston being axially rigidly coupled to said shaft, said piston being slidable within said axial cavity, said hydraulic means being adapted for acting on said piston, and for actuation by sliding movement of said attachment element with respect to said body.

6. Combination according to claim 5, wherein said body has a tubular shape and defines at least one chamber, said chamber being adapted for slidably accommodating said attachment element, communicating with said cavity, and adapted to be filled with hydraulic fluid for actuating said piston.

7. Combination according to claim 1, wherein said device further comprises rack means, at least one toothed wheel, and further rack means, said rack means being rigidly associated with said shaft, said further rack means being rigidly associated with said attachment element, said toothed wheel being rotatably mounted on said body, said rack means engaging with said toothed wheel, said further rack means engaging with and being adapted for actuating said toothed wheel.

8. Combination according to claim 1, wherein said device further comprises at least one slot, at least one other slot, and at least one pivot, said at least one slot being formed in said tool and having a substantially curved profile, said at least one other slot being formed longitudinally in said shaft, said tool being articulated to said shaft in said at least one other slot, said pivot being transversely rigidly associated with said stem, engaging said at least one slot, and adapted for guiding said tool.

9. Combination according to claim 1, wherein said stem has a substantially tubular shape and an end portion, and wherein said shaft is slidably accommodated in said stem, said device further comprising an opening, said opening being formed in said end portion, said tool being adapted for projecting through said opening when rotated to said position whereat said tool projects radially from said stem.

10. Combination according to claim 1, wherein said device further comprises elastic means, said elastic means being adapted for acting against inverse sliding movement of said shaft with respect to said stem.

* * * * *